Patented Apr. 21, 1953

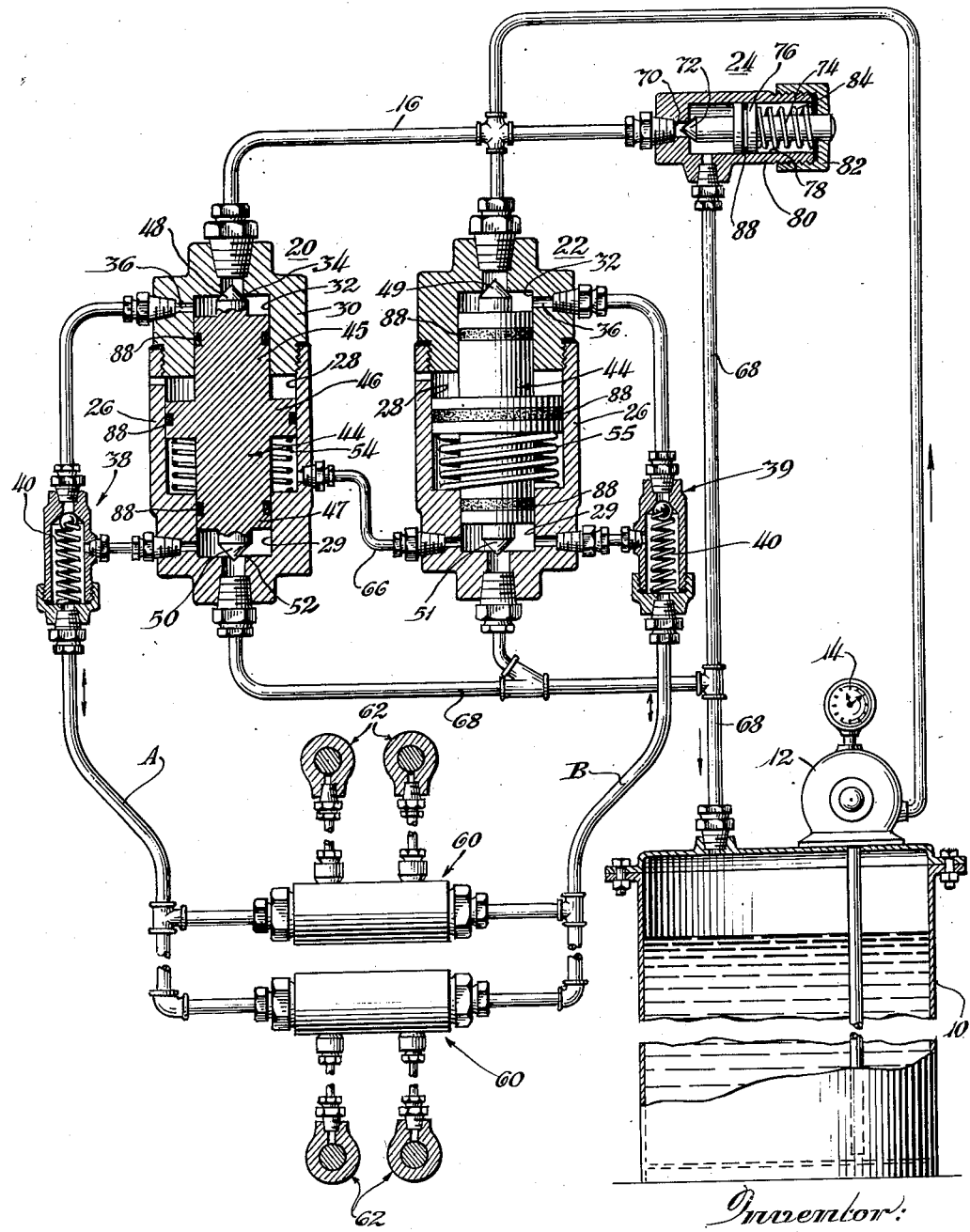

2,635,710

UNITED STATES PATENT OFFICE 2,635,710

AUTOMATIC CONTROL APPARATUS FOR CENTRALIZED LUBRICATING SYSTEMS

Harry R. Tear, Evanston, Ill., assignor to Stewart-Warner Corporation, Chicago, Ill., a corporation of Virginia Application February 18, 1950, Serial No. 144,878

2 Claims. (Cl. 184—7)

My invention relates generally to centralized lubricating systems, and more particularly to improved means for controlling the application and relief of pressure alternately to two conduits connected to measuring or feeder valves for supplying lubricant to parts to be lubricated.

In one type of centralized lubricating system, the measuring or feeder valves by which the lubricant is measured and supplied to the parts to be lubricated, are connected between two line conduits, and it is necessary, for the proper operation of these valves, that the lubricant be supplied under pressure to one of these conduits while being relieved from the other conduit, and vice versa. In the past, the apparatus required to control such application of lubricant pressure to the conduits, was generally complicated, including such parts as solenoid operated valves, pressure operated switches, relays, and the like.

It is the object of my invention to provide an improved automatic control apparatus which includes only hydraulically operated parts, except for an electrically operated time clock mechanism for intermittently energizing the motor driving the lubricant.

A further object is to provide an improved control system for pressure application to centralized lubricating systems, which is positive and reliable in operation, simple in construction, and which may be economically manufactured.

Other objects will appear from the following description, reference being had to the accompanying drawing which illustrates, in part diagrammatically, the improved control apparatus as applied to a centralized lubricating system.

Referring to the drawing, lubricant for supply to the centralized lubricating system is withdrawn from a reservoir 10 by an electric motor driven pump 12 which is operated at periodic intervals by a suitable time clock 14, which is preferably of the type in which the intervals between closures of the motor controlling switch, as well as the duration of such switch closure, may be adjusted to suit the particular requirements of the centralized lubricating system with which it is employed. The pump 12 discharges into a conduit 16 to which control valves 20 and 22 and a pressure relief valve 24 are directly connected.

The control valve 20 comprises a body 26 having cylindrical bores 28 and 29 formed therein, the upper end of the body 26 being closed by a plug 30 having a cylindrical bore 32 therein and having an inlet valve seat 34. The plug 30 also has an outlet 36 which is connected to the inlet of a loaded check valve 38, the loading spring 40 of which is of such size that the valve will open under a relatively low pressure as, for example, 200 p. s. i.

A piston valve member 44 has piston parts 45, 46, and 47 respectively operating in the cylindrical bores 32, 28, and 29, it being noted that the bores 29 and 32 are approximately of the same diameter, while the bore 28 is of substantially larger diameter. The valve member 44 also includes an inlet valve 48 cooperable with the inlet port seat 34 and a vent valve part 50 cooperable with a vent port seat 52. A coil spring 54 is of such strength that the valve 48 will remain seated until the pressure within the conduit 16 exceeds a medium high value as, for example, 1000 p. s. i.

The control valve 22 is similar to the valve 20 in construction, and the same reference characters as used in the description of valve 20 have been applied to the corresponding parts of the control valve 22, except that the inlet valve is designated as 49 and the outlet valve is designated as 51; the valve operating spring 55, which corresponds to the spring 54 is, however, a heavier spring and is adapted to hold the valve 49 closed against a higher pressure, such, for example, as 1200 p. s. i.

The port 36 of the valve 22 is connected to the inlet of a loaded check valve 39 which is similar to the valve 38, and the spring 40 of which is of such strength that the valve will likewise open at a pressure of approximately 200 p. s. i.

The discharge side of the loaded check valve 39 is connected to the lower end of the bore 29 of valve 20 and the discharge side of the check valve 39 is similarly connected to the lower end of the bore of the control valve 22. In addition, the discharge sides of the loaded check valves 38 and 39 are connected to line conduits A and B which supply the lubricant to measuring or feeder valves 60, each being illustrated as supplying lubricant to two bearings 62. The measuring or feeder valve 60 may be of any suitable type in which the valve may be connected to two lubricant supply conduits and by which measured charges of lubricant are discharged to bearings upon the alternate application and relief of lubricant pressure in the two conduits to which the valves are connected. As illustrative of this type of measuring or feeder valve, reference may be had to the patents to J. T. Leonard No. 2,440,410, and R. Wederberg No. 2,392,017.

The lower end of the bore 28 of control valve 20 is connected by a conduit 66 with the lower end of the bore 29 of the control valve 22. The vent ports for the lower ends of the bores 29 of the control valves 20 and 22 are suitably connected to a vent conduit 68 which is connected to the lubricant reservoir 10. The pressure relief check valve 24 has its inlet port 70 connected to the conduit 16, the inlet port being normally closed by a valve 72 at the end of the stem 74 of a piston 76 which is freely reciprocable in a cylindrical bore 78 formed in the body 80 of the relief valve. The piston rod 74 is suitably guided in a cap 82 threaded on the body 80, and the valve 72 is held in closed position by a coil spring 84 compressed between the cap 82 and the piston 76. Lubricant flowing past the valve 72 is vented to the lubricant reservoir through the vent conduit 68. The force applied by the spring 78 is sufficient to hold the valve 72 closed until the pressure attained in the conduit 16 is of a relatively high value, such, for example, as 1400 p. s. i.

Assuming that the system has been charged with lubricant and that the time switch mechanism 14 has operated to cause the electric motor driven pump 12 to supply lubricant under pressure to the conduit 16, the pressure within this conduit will build up until the pressure is sufficiently high to force the valve 48 from its seat 34, which in the example given, would be a pressure of 1000 p. s. i. When the valve 48 moves from its seat, the full pressure is, of course, applied to the top of the piston 45 and the piston member 44 is therefore moved rapidly downwardly, causing its outlet valve 50 to be pressed against its seat 52. Lubricant is then free to flow past the valve 48 through the outlet port 36 and through the loaded check valve 38 to the line conduit A, and the pressure will build up in the conduit A causing all of the measuring or feeder valves 60 which are connected to this conduit to operate and supply measured charges of lubricant to at least one of the bearings connected to each of these valves 60.

The piston member 44 will be retained in its lowermost position with the vent valve 50 closed throughout the operation of the feeder valve 60 by virtue of the fact that a pressure of at least 200 p. s. i. is maintained at the upper end of the bore 32 by virtue of the effect of the loaded check valve 38. The pressure in the upper end of the bore 32 will therefore at all times be greater than that in the lower end of the bore 29 by at least 200 p. s. i., the load imparted by the check valve 38.

After all of the feeder valves 60 have been operated, the pressure within the line conduit A will build up so that the pressure in the conduit 16 will also increase, and this will continue until the pressure attained is sufficient to open the inlet valve 49 of the control valve 22, namely at 1200 p. s. i. for the exemplary pressures given. When the valve 49 opens, the valve 51 is closed, and a short time thereafter the loaded check valve 39 will open to permit flow of lubricant into the line conduit B. At this point in the cycle of operation, the valve member 44 of the control valve 20 is still in its lowered position so that the line conduit A still has lubricant under pressure applied thereto. Thus the feeder valve 60 cannot immediately operate, and the pressure in the line conduit B will therefore build up, and this pressure will be transmitted through the lower end of the bore 29 of the control valve 22 and conduit 66 to the lower end of the bore 28 of control valve 20. This lubricant pressure, added to the force applied by the spring 54 which is compressed between the piston 46 and the lower end of bore 29, will cause the piston valve member 44 to move upwardly, causing the valve 48 to seal against its seat 34, and opening the vent valve 50 to relieve the pressure on the lubricant in the line conduit A and to permit some of it to be vented to the lubricant reservoir 10 through the vent conduit 68.

As soon as the pressure in the line conduit A is relieved, the feeder valves 60 commence operating to discharge measured charges of lubricant to the others of the bearings 62 associated therewith. When all of the feeder valves 60 have thus been operated in the return direction by the lubricant under pressure supplied through the line conduit B, the pressure in the latter conduit will rise and as a result the pressure will also build up in the conduit 16 to a value above that previously required for the operation of the control valve 22 to a pressure such, for example, as 1400 p. s. i., when the relief valve 72 will be forced from its seat, permitting the lubricant to flow from the conduit 16 to the vent conduit 68. Such flow of lubricant will continue during the remaining portion of the operating cycle of the motor driven pump 12 and will, of course, stop when the time switch 14 operates to cut off the current supply to the motor driven pump.

As the pump stops operation, the pressure in the conduit 16 will drop due to the venting of the lubricant therein past the valve 72, this valve remaining open due to the fact that the effective area of the piston 76 is very much greater than that of the seat for the valve 72. The pressure in the conduit 16 will therefore drop to a relatively low value as, for example, 100 p. s. i., and the valve member 44 of the control valve 22 will therefore be returned to its uppermost position by its spring 55, thus completing a cycle of operation.

It will be noted that all of the pistons for operating the various valves of the control system are provided with suitable sealing rings 88, and it is thus not essential that the pistons and the cylindrical bores in which they operate be finished to a high degree of precision, and these parts may therefore be made by customary machining methods without the possibility of affecting the satisfactory operation of the control apparatus.

In order to simplify and make more clear the intended meanings of some of the claims, symbols indicating relative pressure have been employed. These symbols, and the exemplary values of the pressures which they represent, are as follows:

$u$—The pressure at which valve 72 of the relief mechanism 24 closes, e. g., 100 p. s. i.
$v$—The pressure at which check valves 38 and 39 open, e. g., 200 p. s. i.
$x$—The pressure at which the inlet valve 48 of the valve mechanism 20 opens, e. g., 1000 p. s. i.
$y$—The pressure at which the valve 49 of the device 22 opens, e. g., 1200 p. s. i.
$z$—The pressure at which the valve 72 of the relief valve mechanism 24 opens, e. g., 1400 p. s. i.

It will be understood that the exemplary pressures are merely illustrative, and that they should be considered as indicating merely relative, rather than the absolute, values, that is, pressure $v$ is greater than $u$, pressure $x$ greater than $v$, etc.

Furthermore, it will be understood that the apparatus may be made operative without the use of the pressure relief valve 24, since the pump may be made to operate periodically and its discharge line vented automatically upon cessation of operation. Similarly, the valves 38 and 39 are not essential, although they may be used to increase the positiveness and reliability of the operation of the hydraulic devices 20 and 22.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A hydraulic apparatus which has parts, operable at pressures $u$, $v$, $x$, $y$, and $z$, of progressively greater values, for controlling the distribution of lubricant to first and second conduits A and B from a source in which the pressure may at intervals build up to $z$; means providing a vent space in which the pressure is less than $u$; two spring returned valve devices respectively connected to the first and second conduits A and B, to the source, and to the vent space; the first of said valve devices operating from a normal position to an operated position to connect the source to first conduit A when the source pressure exceeds $x$, to close the connection to the vent space, and to maintain its operated position as long as the source pressure is more than $v$ and less than $y$; the second of said valve devices operating from a normal to an operated position to connect the source to second conduit B, to close the connection to the vent space when the source pressure exceeds $y$, and to maintain the second valve device in operated position as long as the source pressure substantially exceeds $u$; means operated by substantial pressure in second conduit B to cause the first valve device to return to its normal position, and pressure relief means connected to the source and spring biased to be opened when the source pressure exceeds $z$ and effective to reduce the source pressure until it reaches $u$.

2. An apparatus for alternately connecting two conduits of a two conduit centralized lubricating system respectively to a space of low pressure and to a source of lubricant under high pressure comprising, two hydraulically operated devices connected to the source, to the conduits respectively, and to the low pressure space; a spring opposed valve in each of said devices, said valves operating at different pressures at the source to connect the source to its associated conduit and to prevent flow from the conduit to said low pressure space; hydraulic means rendered effective after operation of the valve operating at higher pressure to cause the other valve to operate to disconnect its associated conduit from the source and to connect it to the low pressure space, and a relief valve operable to release the pressure of the lubricant from the source to a value lower than that required to operate the lower pressure valve whenever the pressure substantially exceeds that required for the operation of the higher pressure valve.

HARRY R. TEAR.

References Cited in the file of this patent

UNITED STATES PATENTS

| Number | Name | Date |
|---|---|---|
| 1,805,303 | Barks | May 12, 1931 |
| 1,990,986 | Fox | Feb. 12, 1935 |
| 2,007,156 | Burrell | July 9, 1935 |
| 2,019,299 | Fox | Oct. 29, 1935 |
| 2,052,664 | Rotter | Sept. 1, 1936 |